(12) United States Patent
Savoy et al.

(10) Patent No.: US 8,393,839 B2
(45) Date of Patent: Mar. 12, 2013

(54) SELF-LOCKING SCREW CONNECTION

(75) Inventors: Juliano Savoy, Jundiai (BR); Paulo Cesar Sigoli, Jundiai (BR); Mauro Moraes De Souza, Jundiai (BR)

(73) Assignee: Neumayer Tekfor Holding GmbH, Hausach (DE)

( * ) Notice: Subject to any disclaimer, the term of this patent is extended or adjusted under 35 U.S.C. 154(b) by 0 days.

(21) Appl. No.: 13/183,827

(22) Filed: Jul. 15, 2011

(65) Prior Publication Data

US 2011/0305538 A1  Dec. 15, 2011

Related U.S. Application Data

(63) Continuation of application No. PCT/DE2009/001802, filed on Dec. 23, 2009.

(51) Int. Cl.
*F16B 39/10* (2006.01)
(52) U.S. Cl. .......................................... 411/120; 411/198
(58) Field of Classification Search .......... 411/119–120, 411/197–200, 121
See application file for complete search history.

(56) References Cited

U.S. PATENT DOCUMENTS

| 2,561,224 | A | * | 7/1951 | Pischek et al. | 411/120 |
| 3,253,630 | A | * | 5/1966 | Phelan | 411/197 |
| 4,812,094 | A | * | 3/1989 | Grube | 411/134 |
| 5,141,374 | A | * | 8/1992 | Olofsson | 411/141 |
| 5,180,265 | A | * | 1/1993 | Wiese | 411/150 |
| 5,597,278 | A | * | 1/1997 | Peterkort | 411/134 |
| 5,606,753 | A | * | 3/1997 | Hashimoto | 411/7 |
| 5,618,143 | A | * | 4/1997 | Cronin et al. | 411/220 |
| 5,772,373 | A | * | 6/1998 | Cronin et al. | 411/120 |

* cited by examiner

*Primary Examiner* — Flemming Saether
(74) *Attorney, Agent, or Firm* — Crowell & Moring LLP

(57) ABSTRACT

A screw connection having a screw section and a nut threaded thereon. A self-locking effect of the nut on the screw section is achieved in a simple manner in that an intermediate disk is supported non-rotatably on the screw section and is received on the nut so as to be rotatable relative to the nut. The intermediate disk includes a grid distributed around the circumference of the intermediate disk, and the nut carries at least one resiliently elastic, radially displaceable catch formed by a sheet-metal part which, after installing the nut, positively engages the grid to lock the nut against rotation relative to the screw section and intermediate disk. Upon application of a wrench to the nut, the at least one resilient, radially displaceable catch is compressed and drawn out of engagement with the grid, so that the nut can be rotated relative to the screw section.

9 Claims, 1 Drawing Sheet

SELF-LOCKING SCREW CONNECTION

CROSS REFERENCE TO RELATED APPLICATIONS

This application is a continuation of international patent application no. PCT/DE2009/001802, filed Dec. 23, 2009, designating the United States of America, and published in German on Jul. 22, 2010 as WO 2010/081450, the entire disclosure of which is incorporated herein by reference. Priority is claimed based on Federal Republic of Germany patent application no. DE 10 2009 005 334.4, filed Jan. 16, 2009, the entire disclosure of which likewise is incorporated herein by reference.

BACKGROUND OF THE INVENTION

The present invention relates to a self-locking screw connection comprising a screw section and a nut that is mounted on the screw section so as to be self-locked.

Self-locking screw connections have been known for a long time. The thread between the screw section and the nut can be restricted in terms of its mobility, for example, by a plastic insert, which leads to stiffness of the screw connection. Alternatively, provision can be made in the screw section for a splint pin, which prevents the nut from loosening from the screw section, but only in a limited region and requires additional work steps for attaching the splint. Self-locking nuts that are secured by an intermediate washer that is mounted on the screw section so as to rotate therewith in that a positive lock is formed between the nut and the spacer washer, more precisely between a profile of the spacer washer and the polygon of the nut, usually necessitate additional work steps after the nut has been screwed on the screw section. Furthermore, these self-locking nuts can be loosened again only with difficulty once they are snap-fitted during the screwing process. In the case of self-locking nuts, it is often only possible to achieve an insufficient resolution of the pre-stress to be provided or an axial play of the nut to be adjusted.

SUMMARY OF THE INVENTION

It is therefore an object of the invention to provide an improved self-locking screw connection.

Another object of the invention is to provide a structural unit that comprises a self-locking screw connection.

A further object of the invention is to provide a self-locking screw connection that can be easily produced.

Yet another object of the invention is to provide a self-locking screw connection that can be easily mounted.

A still further object of the invention is to provide a self-locking screw connection that can be precisely adjusted.

These and other objects are achieved by providing a screw connection comprising a screw section, a polygonal nut screwed on the screw section, and an intermediate washer, which is secured against rotation relative to the screw section and is mounted for rotation on the nut and comprises a grid disposed on the circumference thereof, and at least one catch that forms a positive lock with the grid, wherein the at least one catch is made of a sheet-metal component that is mounted resiliently and flexibly relative to a surface of the polygon. The term "screw section" is understood to mean a pin, which is provided with an external thread and on which the self-locking nut is screwed. The pin can form a screw comprising a head or it can be provided on a complex component, to which an additional component is attached by the nut. For example, an axle or a steering knuckle can comprise said screw section, to which a rolling bearing such as a roller bearing comprising tapered rollers is attached.

It has proved particularly advantageous if a plurality of catches are provided that are made of a sheet-metal component and that extend axially along the respective associated surface of the polygon and the free ends of which comprise engagement profiles such as hooks that can form a positive lock with the grid. For example, the sheet-metal component that can be provided with the corresponding shape by punching and bending processes can comprise an annular collar, through which the screw section is guided with play and which is attached to the end face of the nut that is oriented away from the intermediate washer in that, for example, a rim provided for this purpose or corresponding axially designed webs that are distributed around the circumference are beaded over. In this way, the sheet-metal component can comprise one to six, preferably three to six catches, for example, in the case of a polygon forming a hexagon, which catches are edge-beaded along the surfaces of the hexagon, the edge-beading resulting in the adjustment of pre-stress such that when the catches are unstressed, they form an inclined angle relative to the surfaces of the hexagon, which inclined angle is sufficient for the end profiles of the catches to engage the grid and form a positive lock with the grid. When the screwing tool, for example a nut screwer or a socket wrench, is applied to the polygon, the catches bear against the surface of the polygon and the positive lock with the grid is released so that the nut can be rotated easily on the screw section or removed from the screw section.

It has proved particularly advantageous if recesses are provided in the surfaces of the polygonal body of the nut, in which recesses the catches can be received when stressed by the screwing tool, thereby forming an effective contact pattern for the screwing tool on the polygonal body of the nut. Furthermore, a bead, for example a shaft that is raised radially from the catch surface, can be provided in the catches, which shaft optionally compensates for a play between the screw tool and the catch surface and enables a complete release of the positive lock between the catches and the grid even if the polygonal body of the nut is not completely inserted into the screwing tool.

In order to form the grid of the intermediate washer, the washer may comprise radially outwardly oriented tongues that are distributed around the outer circumference of the intermediate washer and that are bent around a circular base or flange of the nut to form the grid and the intermediate washer is mounted on the nut so as to be able to rotate and yet is secured against loss. When the screwing tool is not placed on the polygon, the catches relax and move radially outwardly into the intermediate gaps of the grid formed by the tongues of the intermediate washer and thereby prevent rotation of the intermediate washer relative to the nut. When the screwing tool is applied to the polygonal body of the nut, the catches are resiliently compressed into the recesses in the surfaces of the polygon. The grid can also be realized by holes that are punched around the base of the nut and that are distributed over the circumference.

According to the concept of the invention, when a plurality of catches is used, the number of intermediate gaps disposed in the grid is not equal to or a multiple of the number of catches. This means that the distribution of the catches around the periphery of the polygonal body of the nut is coordinated with the number of intermediate gaps in the grid such that at least one of the catches does not engage in an intermediate gap of the grid and remains between two intermediate gaps, but will engage with the next intermediate gap in the event of a small angular rotation of the nut. In this way, it is possible to achieve a higher resolution of the pitch angle of the nut relative to the screw and thus a high resolution of the axial position of the nut on the screw section or the axial spacing of the nut from a component which is to be attached when the nut is locked in place by engagement in the grid of the intermediate washer. For example, in the case of a grid comprising seventeen intermediate gaps and a hexagonal nut comprising six catches, it is possible to achieve a resolution of the torsion angle from the lock-in position of one catch to the lock-in position of the next catch in the grid of approximately 3.5°. In this way, for example, it is possible to mount a bearing on an axle with nearly ideal compressive stress.

The nut is secured relative to the screw section in that the intermediate washer is mounted on the screw section so as to rotate therewith. For this purpose, for example, the screw section may comprise a flat portion against which a counter-surface formed in the opening of the intermediate washer bears. Alternatively, a longitudinal groove can be provided in the screw section into which a projection formed on the intermediate washer engages.

The object of the invention is further achieved by a structural unit comprising a screw connection as suggested above. The structural unit comprises a bearing bolt that is disposed on an abutment and that comprises the screw section, a component slid onto the bearing bolt, and a self-locking nut, which is mounted in the form of a counter-bearing axially on the screw section at an adjusted distance from the abutment by the positioning of the catches relative to the grid. In particular, the slid-on component may be a rolling bearing, for example, a roller bearing comprising tapered rollers. The structural unit can serve as an axle unit comprising a wheel bearing for mounting a wheel of a motor vehicle.

BRIEF DESCRIPTION OF THE DRAWINGS

The invention will be explained in further detail hereinafter with reference to illustrative preferred embodiments depicted in the accompanying drawing figures, in which.

DETAILED DESCRIPTION OF ILLUSTRATIVE EMBODIMENTS

Figure 1:
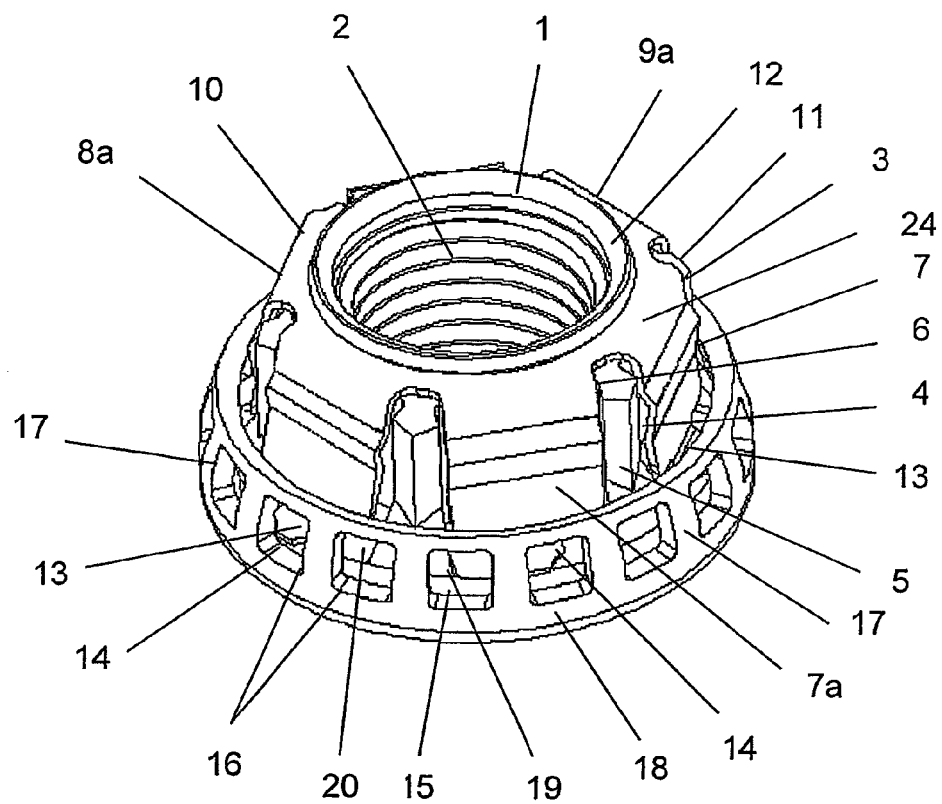
FIG. 1 is an oblique view of a self-locking nut of the screw connection of the invention taken from above.

FIG. 1 shows the self-locking nut 1 of the screw connection which is not depicted in its entirety. Nut 1 comprises an internal thread 2 in which the screw section is screwed. In the illustrative embodiment shown, a polygonal body 3 for rotating the nut 1 by a screwing tool is in the form of a hexagon comprising lateral surfaces 4, 5, each of which comprises a recess 6 into which the catches 7, 7a, 8, 8a, 9, 9a can be received. The catches 7, 7a, 8, 8a, 9, 9a are attached to a common annular collar 10 or mounted as a single part thereon, and the annular collar 10 is permanently connected to the end face 11 of the nut 1. In the illustrative embodiment shown, the annular collar 10 is centered on an annular web 12 that is beaded over in order to secure the annular collar 10 in the axial direction.

The annular collar 10 comprising the catches 7, 7a, 8, 8a, 9, 9a forms a single integral component 24 and is made of a resiliently elastic material such as spring-steel metal sheet. The catches 7, 7a, 8, 8a, 9, 9a are bent such that they can be received into the recesses 6 when subjected to a compressive stress, and when the compressive stress is removed, they pivot radially outwardly with their free ends 13. A bead extending transversely over the catches 7, 7a, 8, 8a, 9, 9a improves the displacement of the catches caused by the screwing tool even if there is play between the screwing tool and the catch surface or if the screwing tool is not fully inserted over the nut up to the base 3 of the polygonal body of the nut 1. The free ends 13 are bent radially outwardly so that they form projections 14 which radially engage in the intermediate gaps 16 of the grid 15 depending on the rotational position of the nut 1 relative to the grid 15. The grid 15 is composed of webs 17, which are provided on the intermediate washer 18 distributed radially around the circumference of the intermediate washer and are bent back axially around the base or flange of the nut to center the nut relative to the washer and secure the intermediate washer 18 to the nut 1 to prevent loss thereof. The intermediate washer 18 remains rotatable relative to the base 19 of the nut 1 and is secured on the screw section so as to rotate therewith. The webs 17 can be realized, for example, by axially bending back that outer circumference of the intermediate washer 18 that is provided with the necessary punched holes or by axially bending the tongues which are disposed radially on the outer circumference of the intermediate washer 18.

The free ends 13 of the catches 7, 7a, 8, 8a, 9, 9a are supported in a recess 20 of the base 19 so as to be displaceable radially in the circumferential direction so that a catch 7, 7a, 8, 8a, 9, 9a can engage with an intermediate gap 16 and ensure that the screw connection is secured against rotation. In the illustrative embodiment shown, the catch 8 engages with the intermediate gap 16 formed by two adjacent webs 17 and thus prevents rotation of the nut 1 relative to the intermediate washer 18. The screw connection is locked against rotation by virtue of the fact that the intermediate washer 18 is mounted on the screw section so as to rotate therewith. As a result of the ratchet mechanism of the grid 15 in the form of the plurality of intermediate gaps 16, the catches 7, 7a, 8, 8a, 9, 9a do not engage simultaneously in the intermediate gaps 16. Rather, the ratchet mechanism can be designed such that only one projection 14 of the catches 7, 7a, 8, 8a, 9, 9a engages at any one time so that even in the case of small torsion angles, a projection 14 of a catch 7, 7a, 8, 8a, 9, 9a locks into position in an intermediate gap 16 of the grid 15 and thus the resolution of a pitch angle is improved. Independently of the pitch of the internal thread 2, the axial play or a pre-stress of the nut 1 relative to a component positioned on the threaded screw section between an abutment and the nut 1 can be adjusted significantly more finely. The catch 7a is shown in a state in which the projection 14 slides between the webs 17. It should be understood that if a lower resolution of the pitch angle is required, it is not necessary to provide all lateral surfaces 5 with catches. In the case of the described use of six catches 7, 7a, 8, 8a, 9, 9a, there results a resolution of the pitch or torsion angle of approximately 3.5°, for example, in the case of seventeen intermediate gaps.

The nut 1 is screwed on the screw section by a screwing tool that displaces the catches into the recesses 6, for example, when fitted on the polygonal body 3 of the nut so that the nut 1 can be rotated onto the screw section by overcoming the usual screwing resistance. The adjustment of the position of the nut relative to a component to be clamped in place by the nut can be carried out in a known manner, for example, by adjusting the torque. After removing the screwing tool, the projection 14 located nearest to an intermediate gap 16 engages with the intermediate gap and secures the nut 1 relative to the screw section with a precision that can be adjusted by appropriate selection of the number of catches and intermediate gaps.

Figure 2:
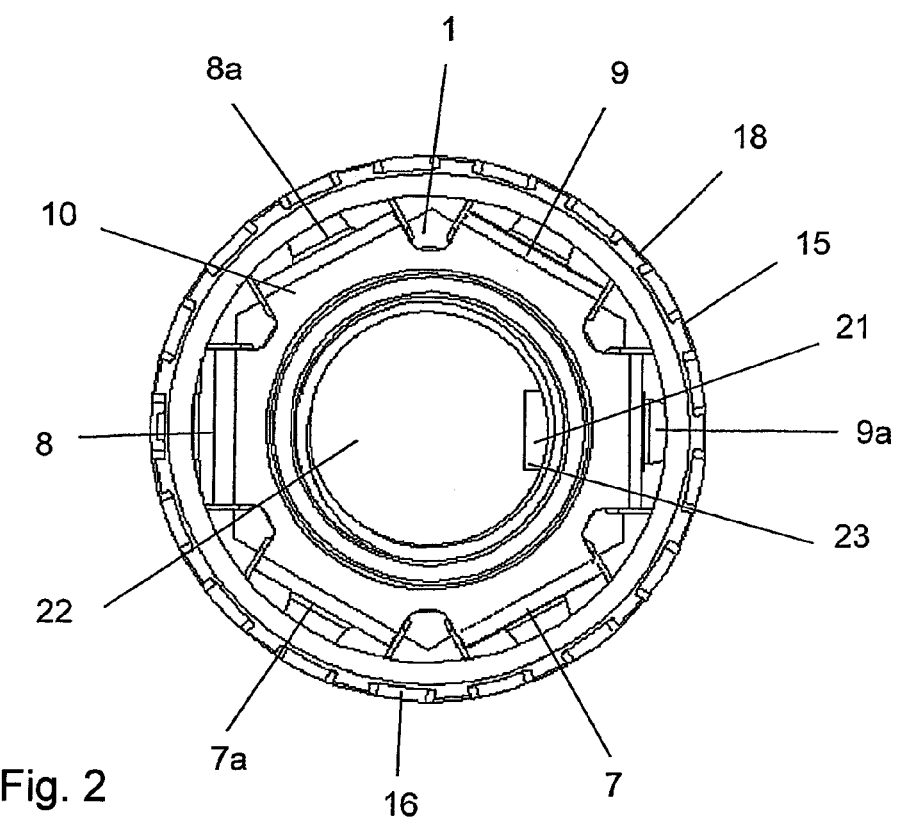
FIG. 2 is a top view of the self-locking nut of FIG. 1.

FIG. 2 is a top view of the nut 1 shown in FIG. 1. FIG. 2 clearly reveals the different positions of the catches 7, 7a, 8, 8a, 9, 9a relative to the grid 15. When the catch 8 is located in its engaged state, a continued rotation of the nut in the clockwise direction causes the next catch 8a to engage with the intermediate gap while the catch 7a covers the maximum rotational distance in order to engage with the intermediate gap 16.

FIG. 2 shows a screw section 22 that comprises a longitudinal groove 23 in which a projection 21 on the intermediate washer 18 engages in the radial direction so that the intermediate washer 18 is mounted on the screw section 22 so as to rotate therewith.

The claims filed with the application are proposed wordings without prejudice to the attainment of further patent protection. The applicant reserves the right to claim additional combinations of features that, so far, have only been disclosed in the description and/or drawings.

References used in the dependent claims refer to further embodiments of the subject matter of the main claim through the features of the respective dependent claim; they are not be construed as a waiver of the attainment of an independent protection of subject matter for the combinations of features of the dependent claims referred to.

Since the subject matter of the dependent claims may constitute separate and independent inventions with respect to the related prior art on the priority date, the applicant reserves the right to make them the subject matter of independent claims or of divisional applications. In addition, they may also include independent inventions, whose creation is independent of the subject matter of the preceding dependent claims.

The illustrative embodiments are not to be construed as limiting the scope of the invention. Rather, numerous revisions and modifications are possible within the framework of the present disclosure, in particular those variants, elements and combinations and/or materials which may be inferred, for example, by combining or altering individual features or elements or process steps described in connection with the general description and specific embodiments as well as the claims, and contained in the drawings, by one skilled in the art with a view to achieving the object, and which, through combinable features, lead to a new object or to new process steps or sequences of process steps, to the extent that these relate to manufacturing, testing, and work methods.

The invention claimed is:

1. A screw connection, comprising:
    a threaded screw section,
    a polygonal nut screwed on the screw section,
    an intermediate washer, which is secured against rotation relative to the screw section and is rotatably mounted on the nut, said intermediate washer comprising a grid disposed on the circumference thereof, and
    at least one catch made of a resilient sheet-metal component mounted on the nut such that when a wrench is applied to the nut, said at least one catch is compressed and drawn out of engagement with the grid so that the nut can be freely turned, and when the wrench is removed from the nut, the catch moves into engagement with the grid to lock the nut against rotation relative to the intermediate washer and the screw section,
    wherein the sheet-metal component is mounted by an annular collar connected to an end face of the nut on the opposite side of the nut from the intermediate washer.

2. The screw connection as recited in claim 1, wherein radially outwardly oriented tongues are distributed around the outer circumference of the intermediate washer, and said grid is formed by bending back the tongues around a circular base of the nut.

3. The screw connection as recited in claim 1, wherein the grid defines a series of intermediate gaps into which said at least one catch may engage, and the number of intermediate gaps in the grid is not equal to the number of catches or a multiple of the number of catches.

4. The screw connection as recited in claim 3, wherein one catch less than the number of catches engages simultaneously in the intermediate gaps of the grid.

5. The screw connection as recited in claim 1, wherein the intermediate washer is secured against rotation relative to the screw section by a flat portion on the screw section against which a mating counter surface on the intermediate washer bears.

6. The screw connection as recited in claim 1, wherein the screw section comprises at least one longitudinal groove in which a projection on the intermediate washer engages to secure the intermediate washer against rotation relative to the screw section.

7. The screw connection as recited in claim 1, wherein said at least one catch forms a positive lock with the grid when the catch is not compressed.

8. The screw connection as recited in claim 1, wherein application of a wrench to the nut compresses said at least one catch against a respective lateral surface of the polygonal nut.

9. A screw connection, comprising:
    a threaded screw section,
    a polygonal nut screwed on the screw section,
    an intermediate washer, which is secured against rotation relative to the screw section and is rotatably mounted on the nut, said intermediate washer comprising a grid disposed on the circumference thereof, and
    at least one catch made of a resilient sheet-metal component mounted on the nut such that when a wrench is applied to the nut, said at least one catch is compressed and drawn out of engagement with the grid so that the nut can be freely turned, and when the wrench is removed from the nut, the catch moves into engagement with the grid to lock the nut against rotation relative to the intermediate washer and the screw section,
    a plurality of catches each disposed on a respective lateral surface of the polygonal nut, and wherein said plurality of catches are integrally formed on a single component,
    wherein said at least one catch is at least substantially flush mounted in a recess in the respective lateral surface of the polygonal nut when the catch is compressed.

* * * * *